US012808658B2

(12) United States Patent
Kyoung et al.

(10) Patent No.: US 12,808,658 B2
(45) Date of Patent: Nov. 24, 2026

(54) SUBSTRATE PROCESSING APPARATUS AND METHOD OF MEASURING FILM THICKNESS

(71) Applicant: Samsung Display Co., Ltd., Yongin-si (KR)

(72) Inventors: Jaisun Kyoung, Cheonan-si (KR); Younggil Park, Asan-si (KR); Jongyun Park, Cheonan-si (KR); Sooim Jeong, Hwaseong-si (KR); Deokhyun Hwang, Cheonan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 320 days.

(21) Appl. No.: 17/955,660

(22) Filed: Sep. 29, 2022

(65) Prior Publication Data

US 2023/0160688 A1 May 25, 2023

(30) Foreign Application Priority Data

Nov. 22, 2021 (KR) ........................ 10-2021-0161693

(51) Int. Cl.
*G01B 11/06* (2006.01)

(52) U.S. Cl.
CPC ...... *G01B 11/0625* (2013.01); *G01B 11/0641* (2013.01)

(58) Field of Classification Search
CPC ............ G01B 11/0625; G01B 11/0641; G01B 11/0683; G01B 11/0616; C23C 16/50; C23C 16/52; C23C 14/547; C23C 14/24; H10K 71/164
See application file for complete search history.

(56) References Cited

U.S. PATENT DOCUMENTS 4,828,391 A 5/1989 Zultzke et al.
6,934,040 B1 * 8/2005 Schietinger ............. B24B 49/12 356/600
7,226,339 B2 6/2007 Benvegnu et al.
8,563,335 B1 10/2013 Benvegnu et al.
8,699,038 B2 4/2014 Schoenleber et al.
(Continued)

FOREIGN PATENT DOCUMENTS

CN 104947040 A 9/2015
CN 206721359 U 12/2017
(Continued)

*Primary Examiner* — Hwa Andrew Lee
(74) *Attorney, Agent, or Firm* — Lerner David LLP

(57) ABSTRACT

A substrate processing apparatus includes a chamber including an accommodation space, a stage disposed in the accommodation space and provided with a substrate disposed thereon, a deposition part disposed under the stage and spraying at least one deposition material to the substrate, and a measurement part disposed adjacent to the deposition part. The measurement part includes an accommodation portion provided with an opening defined through at least one surface thereof, a light source disposed in the accommodation portion and irradiating a first light, at least one transmission portion disposed in the opening, facing the light source, and receiving the first light, and a reception portion facing the at least one transmission portion and receiving the first light reflected from the at least one deposition material as a second light.

15 Claims, 12 Drawing Sheets

(56) References Cited

U.S. PATENT DOCUMENTS

| | | | | |
|---|---|---|---|---|
| 2001/0043984 | A1* | 11/2001 | Otsubo | C23C 16/4401 427/248.1 |
| 2005/0088647 | A1* | 4/2005 | Shanmugasundram | C23C 18/1651 356/326 |
| 2016/0223712 | A1* | 8/2016 | Price | C23C 14/505 |
| 2017/0097226 | A1 | 4/2017 | Seo et al. | |
| 2021/0062324 | A1* | 3/2021 | Ishikawa | H01J 37/228 |
| 2024/0055282 | A1* | 2/2024 | Yang | H01L 22/20 |

FOREIGN PATENT DOCUMENTS

| | | | | | |
|---|---|---|---|---|---|
| DE | 3604624 | A1 | | 8/1987 | |
| JP | H0526624 | A | | 2/1993 | |
| JP | H11211424 | A | | 8/1999 | |
| JP | 6099982 | | | 3/2017 | |
| KR | 10-2006-0064794 | | | 6/2006 | |
| KR | 20080081684 | A | | 9/2008 | |
| KR | 10-1140766 | | | 5/2012 | |
| KR | 10-1387917 | | | 4/2014 | |
| KR | 10-1398567 | | | 5/2014 | |
| KR | 20170040427 | A | | 4/2017 | |
| KR | 10-1882510 | | | 7/2018 | |
| KR | 10-1918803 | | | 11/2018 | |
| KR | 102019415 | | * | 9/2019 | H01J 37/32935 |
| KR | 20210006093 | A | | 1/2021 | |
| WO | WO-2010085496 | A1 | * | 7/2010 | G01B 11/0625 |

* cited by examiner

SUBSTRATE PROCESSING APPARATUS AND METHOD OF MEASURING FILM THICKNESS

CROSS-REFERENCE TO RELATED APPLICATION(S)

This U.S. non-provisional patent application claims priority to and benefits of Korean Patent Application No. 10-2021-0161693 under 35 U.S.C. § 119, filed on Nov. 22, 2021 in the Korean Intellectual Property Office (KIPO), the entire contents of which are incorporated herein by reference.

BACKGROUND

1. Technical Field

The disclosure relates to a substrate processing apparatus capable of measuring an in-situ thickness and a method of measuring a film thickness.

2. Description of the Related Art

A display panel may include various electrodes and various layers. The electrodes and layers may be formed in several ways one of which may be an independent deposition method. In a manufacturing process of an organic light emitting display device, a fine metal mask (FMM) having a pattern similar to that of a thin film layer may be brought into close contact with a surface where the thin film layer is to be formed, a material for the thin film layer may be deposited, and thus, the thin film layer may be formed.

In the manufacturing process of the display panel, the success or failure of the deposition process may be evaluated based on a film thickness of the deposition material deposited on the substrate.

SUMMARY

The disclosure provides a substrate processing apparatus capable of measuring an in-situ thickness.

The disclosure provides a method of measuring a film thickness.

Embodiments provide a substrate processing apparatus that may include a chamber including an accommodation space, a stage disposed in the accommodation space and provided with a substrate disposed thereon, a deposition part disposed under the stage and spraying at least one deposition material to the substrate, and a measurement part disposed adjacent to the deposition part. The measurement part may include an accommodation portion provided with an opening defined through at least one surface thereof, a light source disposed in the accommodation portion and irradiating a first light, at least one transmission portion disposed in the opening, facing the light source, and receiving the first light, and a reception portion facing the at least one transmission portion and receiving the first light reflected from the at least one deposition material as a second light.

The at least one transmission portion may include a first surface, and a second surface facing the first surface, and the at least one deposition material may be deposited on the second surface.

The substrate processing apparatus may further include a controller electrically connected to the measurement part, and the controller may calculate a first thickness of the at least one deposition material deposited on the at least one transmission portion based on the second light.

The controller may calculate the first thickness based on a reflectance of the at least one deposition material or a change in elliptical polarization of the at least one deposition material.

The controller may calculate a second thickness of the at least one deposition material deposited on the substrate based on the first thickness.

The controller may calculate the second thickness in real time.

The at least one transmission portion may include transmission portions, and the controller may replace the transmission portions based on the first thickness.

The measurement part may further include a rotating member that rotates with respect to a first axis, and the transmission portions may be disposed on the rotating member.

The rotating member may include blocking members blocking the transmission portions that may not overlap the light source among the transmission portions in a cross-sectional view.

The at least one deposition material may include deposition materials, the deposition materials may include a first deposition material, and a second deposition material different from the first deposition material, the controller may control the transmission portions such that one of the transmission portions may be disposed to overlap the light source in a cross-sectional view in case that the first deposition material is deposited, and the controller may control the transmission portions such that another one of the transmission portions may be disposed to overlap the light source in a cross-sectional view in case that the second deposition material may be deposited.

The first light may be a white light or a laser light.

The measurement portion may be disposed in the accommodation space.

Embodiments of the inventive concept provide a method of measuring a film thickness. The method may include providing a substrate in a chamber including an inner space including a measurement part. The measurement part may include a light source irradiating a first light, at least one transmission portion receiving the first light, and a reception portion disposed adjacent to the light source. The method may include providing a deposition part spraying at least one deposition material, depositing a deposition layer on the at least one transmission portion, providing the first light to the at least one transmission portion and through the transmission portion and the deposition layer, and to be provided to the at least one transmission portion as a second light after being reflected from a surface at which the deposition layer meets the inner space, and allowing the reception portion to receive the second light.

The method may further include spraying the at least one deposition material on the substrate.

The method may further include removing the substrate from the chamber after the spraying of the at least one deposition material on the substrate, and calculating a thickness of the at least one deposition material based on the second light after the removing of the substrate from the chamber.

The method may further include moving the deposition part after the spraying of the at least one deposition material on the substrate and calculating a thickness of the at least one deposition material based on the second light after the moving of the deposition part.

The transmission portion may include a first surface facing the light source and a second surface facing the first surface, and the deposition material may be deposited on the second surface.

The at least one transmission portion may include transmission portions, and the method further may include replacing the transmission portions based on a thickness of the at least one deposition material deposited on the second surface.

The replacing of the transmission portions may include rotating a rotating member on which the transmission portions may be disposed with respect to a first axis.

The at least one deposition material may include deposition materials, and the deposition materials may include a first deposition material and a second deposition material different from the first deposition material. The method may further include controlling the transmission portions such that one of the transmission portions may be disposed to overlap the light source in a cross-sectional view in case that the first deposition material is deposited on the second surface, and controlling the transmission portions such that another one of the transmission portions may be disposed to overlap the light source in a cross-sectional view in case that the second deposition material is deposited on the second surface.

According to the above, the controller of the substrate processing apparatus may calculate the thickness of the deposition layer deposited on the substrate based on the thickness of the deposition layer deposited on the measurement part. As the deposition process proceeds, the deposition material may be deposited on the transmission portion to a thickness similar to a thickness of the deposition material deposited on the substrate. An accuracy of the calculated thickness of the deposition layer deposited on the substrate may be improved by the thickness of the deposition layer deposited on the measurement part. Accordingly, the reliability of the film thickness measurement method and the substrate processing apparatus using the film thickness measurement method may be improved.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
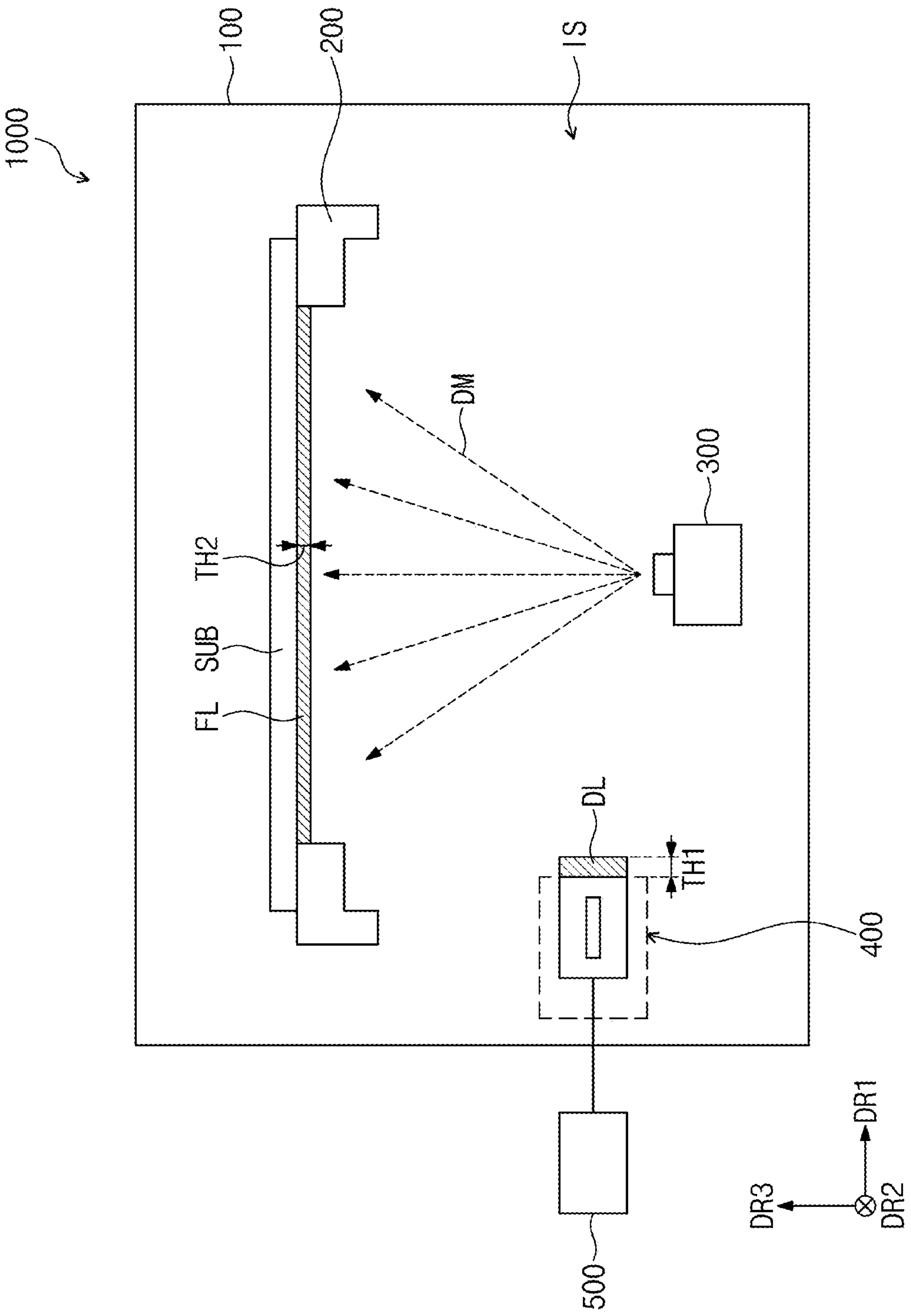
FIG. 1 is a schematic view of a substrate processing apparatus according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components may be exaggerated for effective description of the technical content. As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or."

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or to "not overlap" another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The expression "in plan view" may mean a view from above, or a view from a different relative position.

"About" or "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic view of a substrate processing apparatus 1000 according to an embodiment of the disclosure.

Referring to FIG. 1, the substrate processing apparatus 1000 may include a chamber 100, a stage 200, a deposition unit (part) 300, a measurement unit (part) 400, and a control unit (controller) 500.

The chamber 100 may include an accommodation space IS defined therein.

The stage 200 may be disposed in the accommodation space IS. A substrate SUB may be disposed on the stage 200. Thin film layers may be formed on the substrate SUB.

The substrate SUB may be a component forming a display panel. As an example, the substrate SUB may be a portion of an organic light emitting display panel including organic light emitting elements, however, this is merely an example. According to an embodiment, the display panel may be a quantum dot display panel, a micro-LED display panel, or a nano-LED display panel.

The substrate SUB may include a surface substantially parallel to a plane defined by a first direction DR1 and a second direction DR2. A third direction DR3 may indicate a thickness direction of the substrate SUB. Front (or upper) and rear (or lower) surfaces of the substrate SUB may be distinguished from each other in the third direction DR3. The third direction DR3 may cross (intersect) the first direction DR1 and the second direction DR2. For example, the first, second, and third directions DR1, DR2, and DR3 may be substantially perpendicular to each other. In the disclosure, the surface defined by the first direction DR1 and the second direction DR2 may be defined as a plane.

The deposition unit 300 may be disposed in the accommodation space IS. The deposition unit 300 may be disposed above or under the stage 200, however, it is merely an example. According to an embodiment, a position of the deposition unit 300 should not be particularly limited. As an example, the deposition unit 300 may be disposed adjacent to the stage 200. The deposition unit 300 may spray a deposition material DM to the substrate SUB.

The measurement unit 400 may be disposed in the accommodation space IS. The measurement unit 400 may be disposed adjacent to the deposition unit 300. In FIG. 1, the measurement unit 400 may be disposed toward the first direction DR1, however, the direction toward which the measurement unit 400 may be disposed should not be limited thereto or thereby. As an example, the measurement unit 400 may be disposed toward a direction opposite to the third direction DR3.

The control unit 500 may be connected to the measurement unit 400. In FIG. 1, the control unit 500 may be disposed outside the chamber 100, however, the position of the control unit 500 should not be limited thereto or thereby. For instance, the control unit 500 may be disposed in the accommodation space IS of the chamber 100.

The control unit 500 may calculate a first thickness TH1 of a second deposition layer DL deposited on the measurement unit 400 based on a value measured by the measurement unit 400. The control unit 500 may calculate a second thickness TH2 of a first deposition layer FL deposited on the substrate SUB based on the first thickness TH1. This will be described in detail later.

Figure 2:
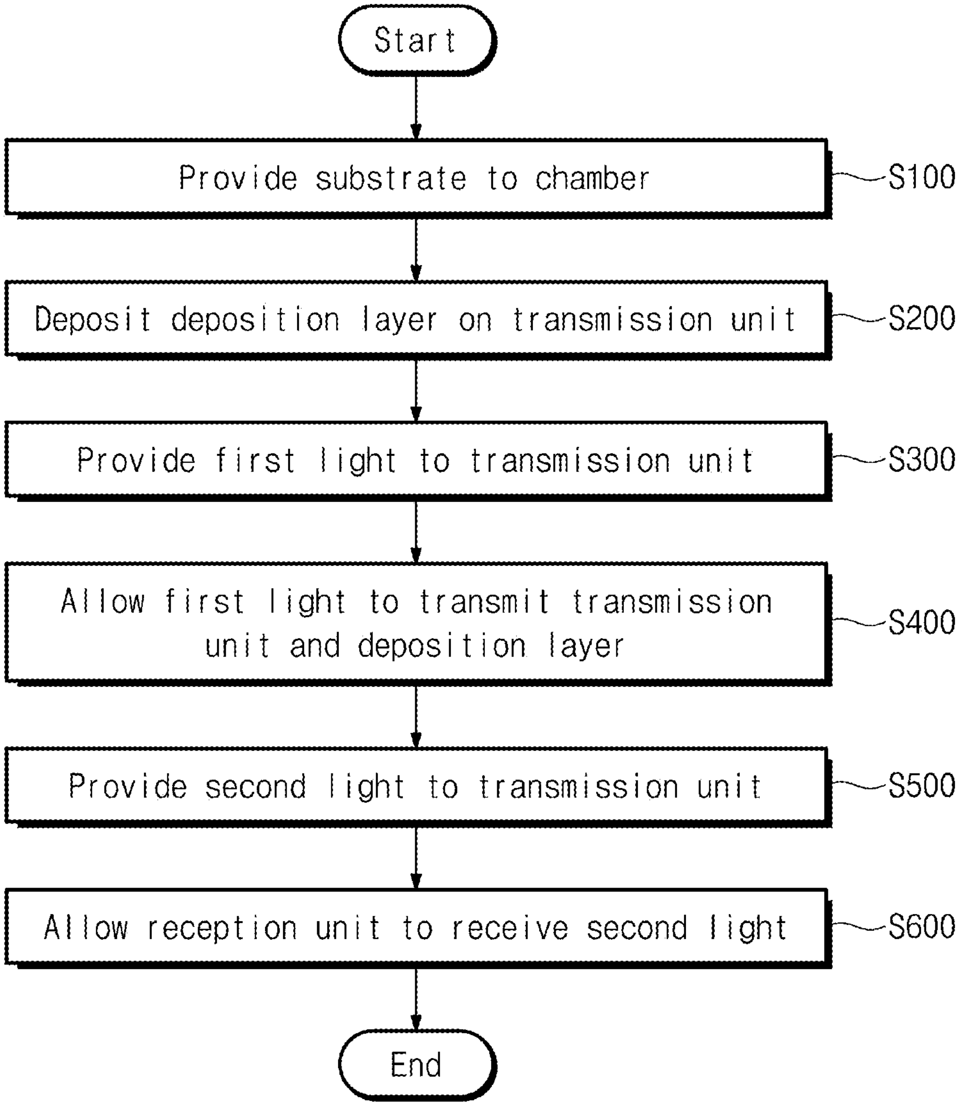
FIG. 2 is a schematic flowchart of a method of measuring a film thickness according to an embodiment of the disclosure.
Figure 3A:
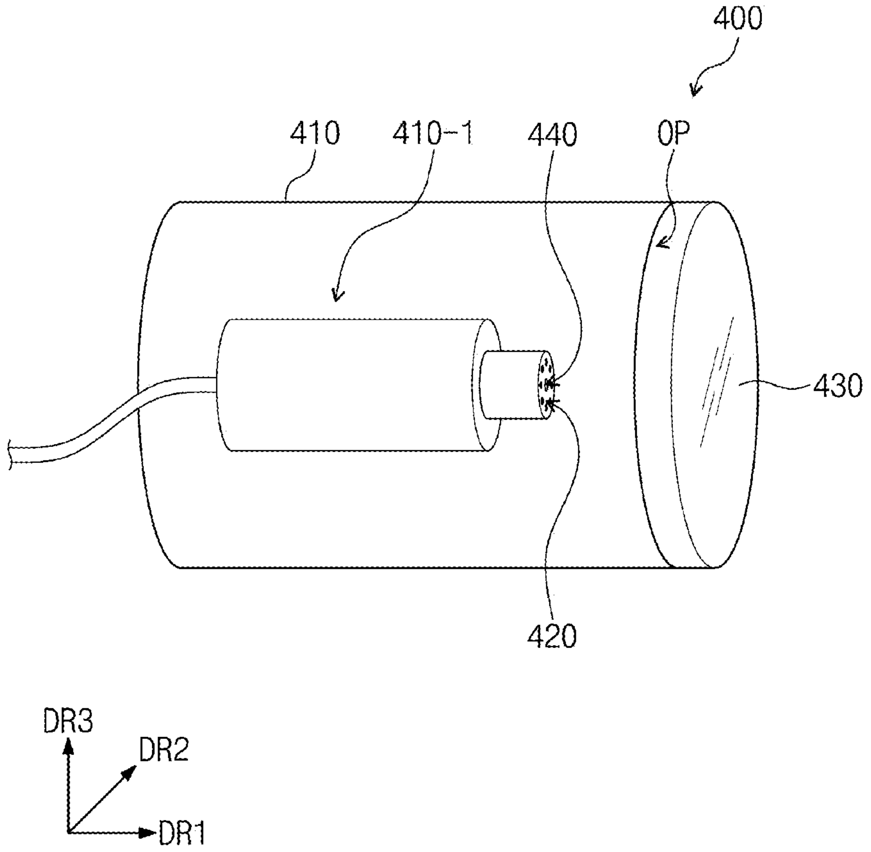
FIG. 3A is a schematic transparent perspective view of a measurement unit according to an embodiment of the disclosure.
Figure 3B:
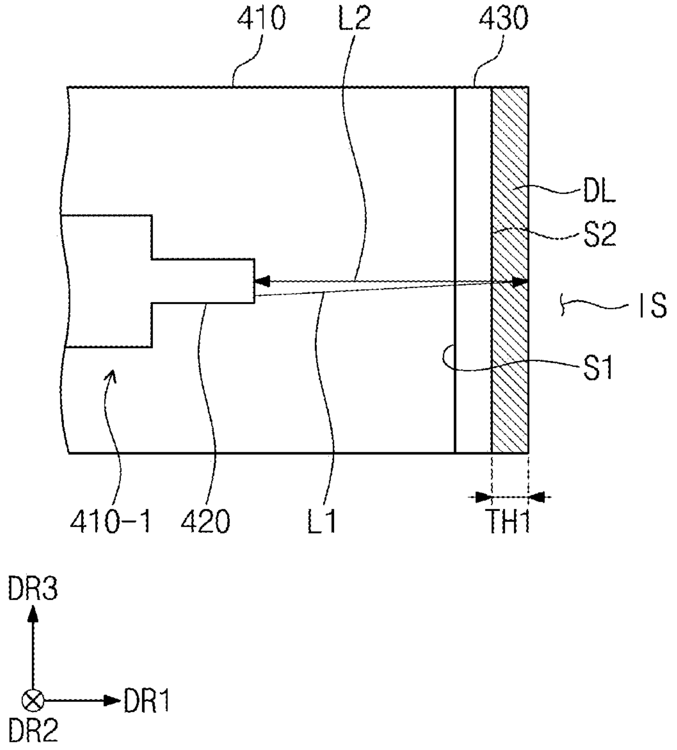
FIG. 3B is a schematic cross-sectional view of a portion of a measurement unit according to an embodiment of the disclosure.

FIG. 2 is a schematic flowchart of a method of measuring a film thickness according to an embodiment of the disclosure. FIG. 3A is a schematic transparent perspective view of the measurement unit 400 according to an embodiment of the disclosure. FIG. 3B is a schematic cross-sectional view of a portion of the measurement unit 400 according to an embodiment of the disclosure.

Referring to FIGS. 1 to 3B, the measurement unit 400 may include a reflectometer. The measurement unit 400 may include an accommodation portion 410, a light source 420, a transmission portion 430, and a reception portion 440.

An opening OP may be defined through at least one surface of the accommodation portion 410.

The light source 420 may be disposed in an inner space 410-1 of the accommodation portion 410. The light source 420 may be protected by the accommodation portion 410.

According to an embodiment, as the light source 420 may be protected by the accommodation portion 410, the light source 420 may be prevented from being contaminated by the deposition material DM while the deposition unit 300 performs the deposition process. Accordingly, a reliability of the film thickness measurement method and the substrate processing apparatus 1000 using the film thickness measurement method may be improved.

The transmission portion 430 may be disposed at the opening OP. The transmission portion 430 may face the light source 420. The transmission portion 430 may include a glass material, however, this is merely an example. The transmission portion 430 may include a material that transmits a light. The transmission portion 430 may include a first surface S1 and a second surface S2.

The reception portion 440 may be disposed to face the transmission portion 430. The reception portion 440 may be disposed adjacent to the light source 420. Multiple light sources 420 may be provided. The light sources 420 may surround the reception portion 440.

The substrate SUB may be provided in the accommodation space IS of the chamber 100 (S100). The substrate SUB may be disposed above or under the stage 200.

The deposition unit 300 may deposit the deposition material DM on the substrate SUB. The first deposition layer FL may be formed on the substrate SUB.

The deposition material DM may be deposited on the transmission portion, and the second deposition layer DL may be formed (S200).

The light source 420 may irradiate a first light L1. The first light L1 may include a white light or a laser light.

The first light L1 may be provided to the transmission portion 430 (S300).

The first light L1 may transmit through the transmission portion 430 and the second deposition layer DL (S400).

The first light L1 may be reflected from a surface at which the second deposition layer DL meets the accommodation space IS. The reflected first light L1 may be referred to as a second light L2. The second light L2 may be provided toward the transmission portion 430 (S500).

The reception portion 440 may receive the second light L2 (S600).

The control unit 500 may calculate the first thickness TH1 of the second deposition layer DL deposited on the transmission portion 430 based on the second light L2. The control unit 500 may calculate the first thickness TH1 based on a reflectance measured on the basis of the second light L2.

The control unit 500 may calculate the second thickness TH2 of the first deposition layer FL deposited on the substrate SUB based on the first thickness TH1.

The thickness of the first deposition layer FL deposited on the substrate SUB may be measured in various ways that may be different from the method of the disclosure. As an example, a quartz crystal microbalance (QCM) may be used to measure the thickness. The quartz crystal microbalance (QCM) may be a mass measuring device capable of measuring a minute amount of a substance. A quartz crystal contained in the quartz crystal microbalance (QCM) may vibrate regularly with its natural frequency. A mass of the deposition material DM deposited on the substrate SUB may be measured using a frequency measured by the quartz crystal microbalance (QCM) and a variation of the natural frequency. In this case, the thickness of the substrate SUB may be calculated indirectly based on the above mass. However, since the thickness may be indirectly calculated based on the mass, an accuracy of the calculated thickness may be relatively low. Since the mass may be calculated by measuring the frequency, it may be sensitively affected by vibration. However, according to the disclosure, the control unit 500 may calculate the second thickness TH2 of the first deposition layer FL deposited on the substrate SUB based on the first thickness TH1 measured by the measurement unit 400. As the deposition process proceeds, the deposition material DM may be deposited on the transmission portion 430 to a thickness similar to a thickness of the deposition material DM deposited on the substrate SUB. The second thickness TH2 of the first deposition layer FL deposited on the substrate SUB may be calculated based on the first thickness TH1 of the second deposition layer DL deposited on the measurement unit 400. The accuracy of the calculated second thickness TH2 may be improved by the first thickness TH1. Accordingly, the reliability of the film thickness measurement method and the substrate processing apparatus 1000 using the film thickness measurement method may be improved.

Different from the disclosure, an optical emission spectroscopy (OES) may be used as a method to measure the thickness of the first deposition layer FL deposited on the substrate SUB. The optical emission spectroscopy (OES) may be a device capable of measuring a plasma generation state. The optical emission spectroscopy (OES) may measure an electron temperature, a plasma density, and chemical species, and the like. Accordingly, the thickness of the substrate SUB may be calculated indirectly. However, since the thickness of the substrate SUB may be indirectly calculated based on the mass, an accuracy of the calculated thickness may be relatively low. Since the thickness may be measured only in a plasma state in case of using the optical emission spectroscopy (OES), the measurement method using the optical emission spectroscopy (OES) may not be applied in the deposition process that may not be performed in the plasma state. However, according to the disclosure, the control unit 500 may calculate the second thickness TH2 of the deposition material DM deposited on the substrate SUB based on the first thickness TH1 measured by the measurement unit 400. As the deposition process proceeds, the deposition material DM may be deposited on the transmission portion 430 to a thickness similar to a thickness of the deposition material DM deposited on the substrate SUB. The second thickness TH2 of the first deposition layer FL deposited on the substrate SUB may be calculated based on the first thickness TH1 of the second deposition layer DL deposited on the measurement unit 400. For example, the accuracy of the calculated second thickness TH2 may be improved by the first thickness TH1 regardless of the plasma state in the process. Accordingly, the reliability of the film thickness measurement method and the substrate processing apparatus 1000 using the film thickness measurement method may be improved.

Further, different from the disclosure, a reflectometer or an ellipsometer may irradiate a light to the substrate SUB to measure the second thickness TH2 of the first deposition layer FL deposited on the substrate SUB. In this case, as a size of the substrate SUB increases, an irradiation distance of the light irradiated from the reflectometer or ellipsometer may increase. In case that the irradiation distance increases, a path of the light may be distorted, and the reflectometer or ellipsometer may not receive the light. In a case where the reflectometer or the ellipsometer may be disposed in the chamber 100, the reflectometer or the ellipsometer may be contaminated by the deposition material DM sprayed from the deposition unit 300. However, according to the disclosure, the separate measurement unit 400 may be installed in the substrate processing apparatus 1000. The second thickness TH2 of the first deposition layer FL deposited on the substrate SUB may be calculated based on the first thickness TH1 of the second deposition layer DL deposited on the measurement unit 400. Accordingly, the reliability of the film thickness measurement method and the substrate processing apparatus 1000 using the film thickness measurement method may be improved.

Figure 4:
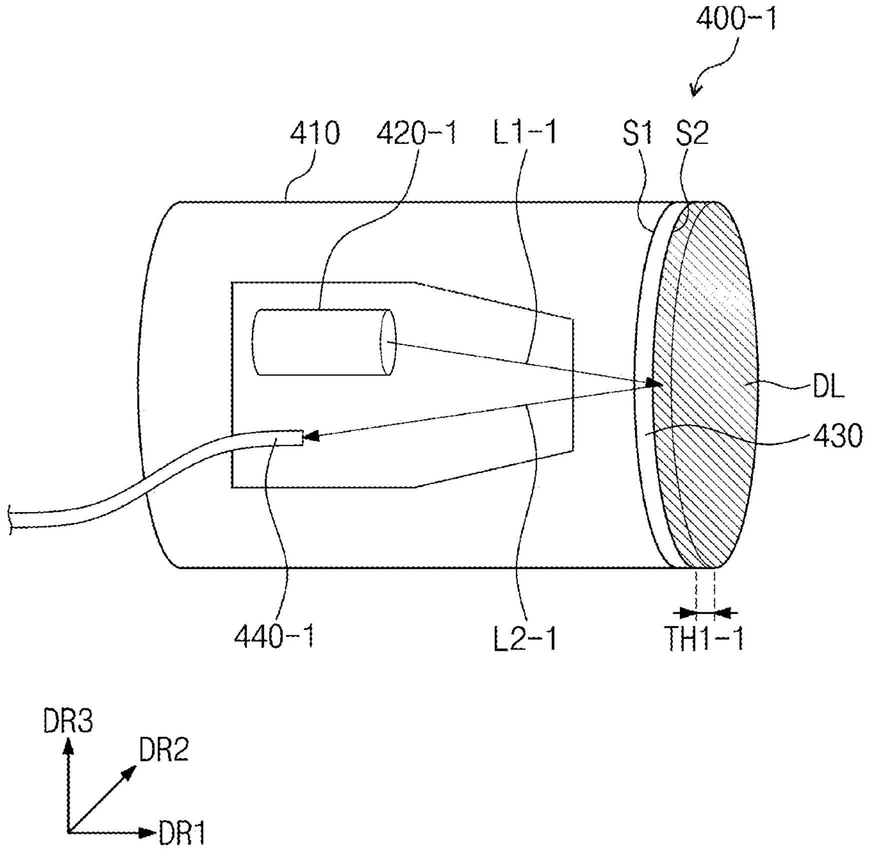
FIG. 4 is a schematic transparent perspective view of a measurement unit according to an embodiment of the disclosure.

FIG. 4 is a schematic transparent perspective view of a measurement unit 400-1 according to an embodiment of the disclosure. In FIG. 4, the same/similar reference numerals denote the same/similar elements in FIG. 3A, and thus, detailed descriptions of the same/similar elements will be omitted.

Referring to FIGS. 1 and 4, the measurement unit 400-1 may include an ellipsometer. The measurement unit 400-1 may include an accommodation portion 410, a light source 420-1, a transmission portion 430, and a reception portion 440-1.

The light source 420-1 may be spaced apart from the reception portion 440-1 by a predetermined distance.

The light source 420 may irradiate a first light L1-1. The first light L1-1 may include a white light or a laser light.

The first light L1-1 may be provided to the transmission portion 430.

The first light L1-1 may transmit through the transmission portion 430 and a second deposition layer DL.

The first light L1-1 may be reflected by a surface at which the second deposition layer DL meets an accommodation space IS. The reflected first light L1-1 may be referred to as a second light L2-1. The second light L2-1 may be provided toward the transmission portion 430.

The reception portion 440-1 may receive the second light L2-1.

The control unit 500 may calculate a first thickness TH1-1 of the second deposition layer DL deposited on the transmission portion 430 based on the second light L2-1. The control unit 500 may calculate the first thickness TH1-1 based on a change in elliptical polarization measured based on the second light L2-1.

The control unit 500 may calculate the second thickness TH2 of the first deposition layer FL deposited on the substrate SUB based on the first thickness TH1-1.

According to the disclosure, the control unit 500 may calculate the second thickness TH2 of the first deposition layer FL deposited on the substrate SUB based on the first thickness TH1-1 measured by the measurement unit 400-1. As the deposition process proceeds, the deposition material DM may be deposited on the transmission portion 430 to a thickness similar to a thickness of the deposition material DM deposited on the substrate SUB. The second thickness TH2 of the deposition material DM deposited on the substrate SUB may be calculated based on the first thickness TH1-1 of the second deposition layer DL deposited on the measurement unit 400-1. The accuracy of the calculated second thickness TH2 may be improved by the first thickness TH1. Accordingly, the reliability of the film thickness measurement method and the substrate processing apparatus 1000 using the film thickness measurement method may be improved.

Figure 5:
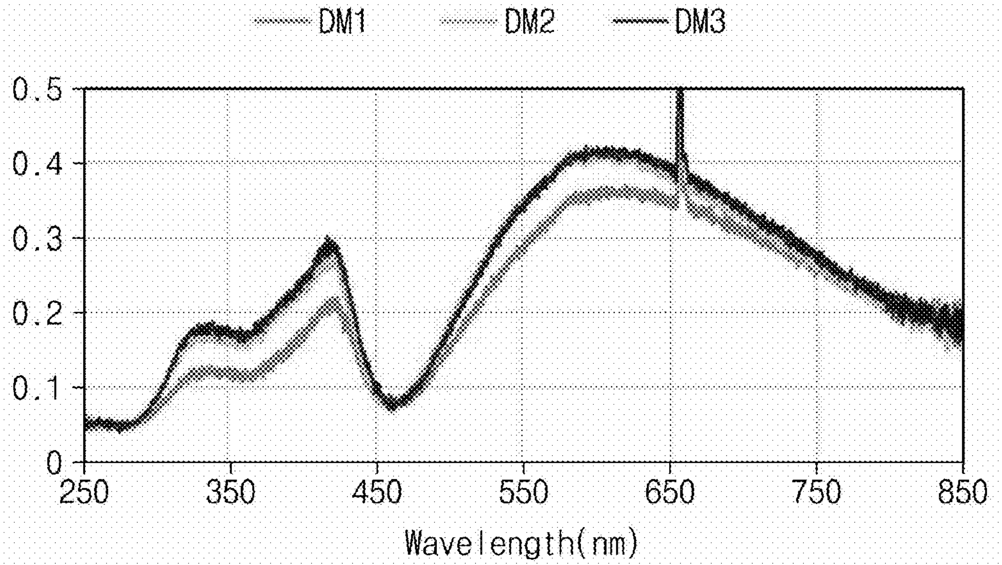
FIG. 5 is a schematic graph of a reflectance as a function of a wavelength according to an embodiment of the disclosure.

FIG. 5 is a schematic graph of a reflectance as a function of a wavelength according to an embodiment of the disclosure.

Referring to FIGS. 1, 3A, 3B, and 5, the measurement unit 400 may measure a relative reflectance of multiple samples at each wavelength.

The deposition material DM may include the samples. The samples may include a first sample, a second sample, and a third sample. Each of the first sample, the second sample, and the third sample may be a different deposition material DM.

A first graph DM1 shows the relative reflectance of the first sample at each wavelength. In case that the deposition process is performed on the first sample of the substrate SUB, the first sample may be deposited on a second surface S2 of the transmission portion 430.

A second graph DM2 shows the relative reflectance of the second sample at each wavelength. In case that the deposition process is performed on the second sample of the substrate SUB, the second sample may be deposited on the second surface S2 of the transmission portion 430.

A third graph DM3 shows the relative reflectance of the third sample at each wavelength. In case that the deposition process is performed on the third sample of the substrate SUB, the third sample may be deposited on the second surface S2 of the transmission portion 430.

The samples may have different graphs DM1, DM2, and DM3, respectively. For example, the control unit 500 may readily calculate the first thickness TH1 of the second deposition layer DL based on the reflectance that varies depending on the deposition material.

According to the disclosure, the control unit 500 may calculate the second thickness TH2 of each of the samples deposited on the substrate SUB based on the first thickness TH1 measured by the measurement unit 400. As the deposition process may be performed on each sample, each of the samples may be deposited on the transmission portion 430 to a thickness similar to a thickness of each of the samples deposited on the substrate SUB. The second thickness TH2 of each of the samples deposited on the substrate SUB may be calculated based on the first thickness TH1 of the second deposition layer DL deposited on the measurement unit 400. Accordingly, the reliability of the film thickness measurement method and the substrate processing apparatus 1000 using the film thickness measurement method may be improved.

Figure 6:
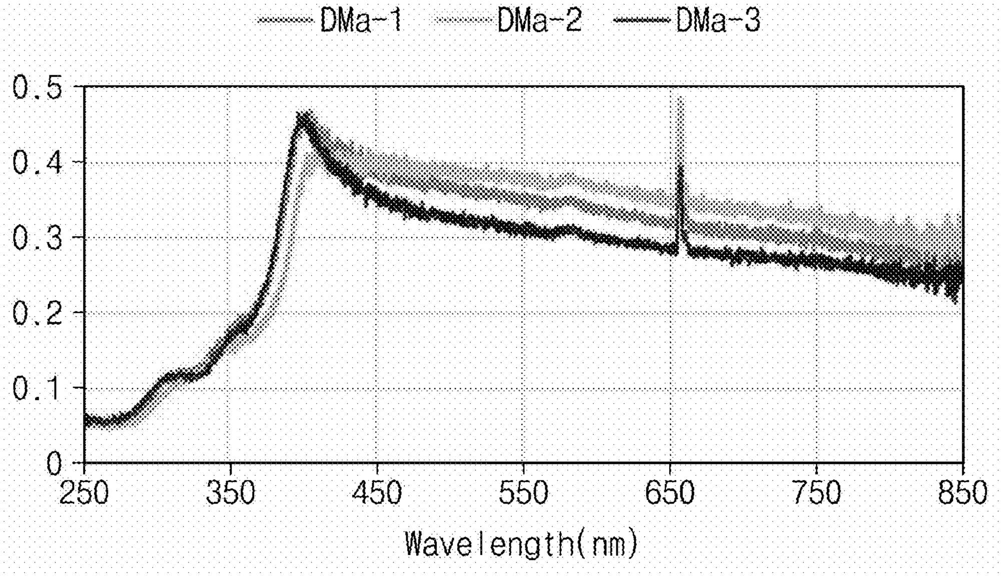
FIG. 6 is a schematic graph of a reflectance as a function of a wavelength according to an embodiment of the disclosure.

FIG. 6 is a schematic graph of a reflectance as a function of a wavelength according to an embodiment of the disclosure.

FIG. 6 shows relative reflectances measured by the measurement unit 400 in case that one deposition material DM is deposited at different thicknesses.

Referring to FIGS. 1, 3A, 3B, and 6, graphs DMa-1, DMa-2, and DMa-3 may be obtained by measuring the relative reflectances of the one deposition material by varying a thickness of the one deposition material. As an example, the first graph DMa-1 shows the reflectance measured in a state that the thickness of the one deposition material may be about 20% less than a predetermined reference thickness, the second graph DMa-2 shows the reflectance measured in a state that the one deposition material may be deposited at the predetermined reference thickness, and the third graph DMa-3 shows the reflectance measured in a state that the thickness of the one deposition material may be about 20% more than the predetermined reference thickness.

According to the disclosure, the measurement unit 400 may measure the relative reflectances different from each other depending on the first thickness TH1. The control unit 500 may calculate the first thickness TH1 based on the relative reflectances represented by the graphs. The control unit 500 may readily calculate the second thickness TH2 of the deposition material DM deposited on the substrate SUB based on the first thickness TH1 measured by the measurement unit 400. Accordingly, the reliability of the film thickness measurement method and the substrate processing apparatus 1000 using the film thickness measurement method may be improved.

Figure 7:
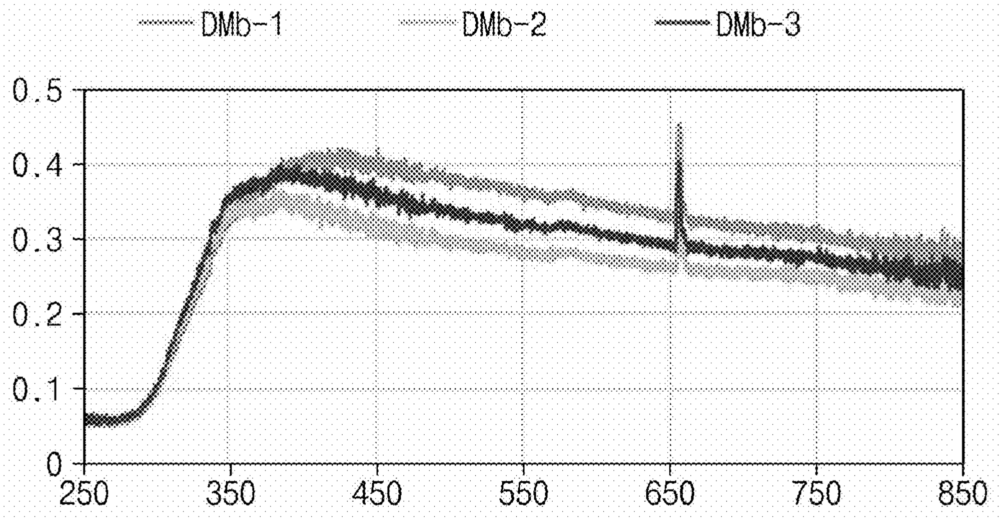
FIG. 7 is a schematic graph of a reflectance as a function of a wavelength according to an embodiment of the disclosure.

FIG. 7 is a schematic graph of a reflectance as a function of a wavelength according to an embodiment of the disclosure.

FIG. 7 shows relative reflectances measured by the measurement unit 400 in case that another deposition material DM is deposited at different thicknesses.

Referring to FIGS. 1, 3A, 3B, and 7, graphs DMb-1, DMb-2, and DMb-3 may be obtained by measuring the relative reflectance of the another deposition material by varying a thickness of the another deposition material. As an example, the first graph DMb-1 shows the reflectance measured in a state that the thickness of the another deposition material may be about 20% less than a predetermined reference thickness, the second graph DMb-2 shows the reflectance measured in a state that the another deposition material may be deposited at the predetermined reference thickness, and the third graph DMb-3 shows the reflectance measured in a state that the thickness of the another deposition material may be about 20% more than the predetermined reference thickness.

According to the disclosure, the measurement unit 400 may measure the relative reflectances different from each other depending on the first thickness TH1. The control unit 500 may calculate the first thickness TH1 based on the relative reflectances represented by the graphs. The control unit 500 may readily calculate the second thickness TH2 of the deposition material DM deposited on the substrate SUB based on the first thickness TH1 measured by the measurement unit 400. Accordingly, the reliability of the film thickness measurement method and the substrate processing apparatus 1000 using the film thickness measurement method may be improved.

Figure 8A:
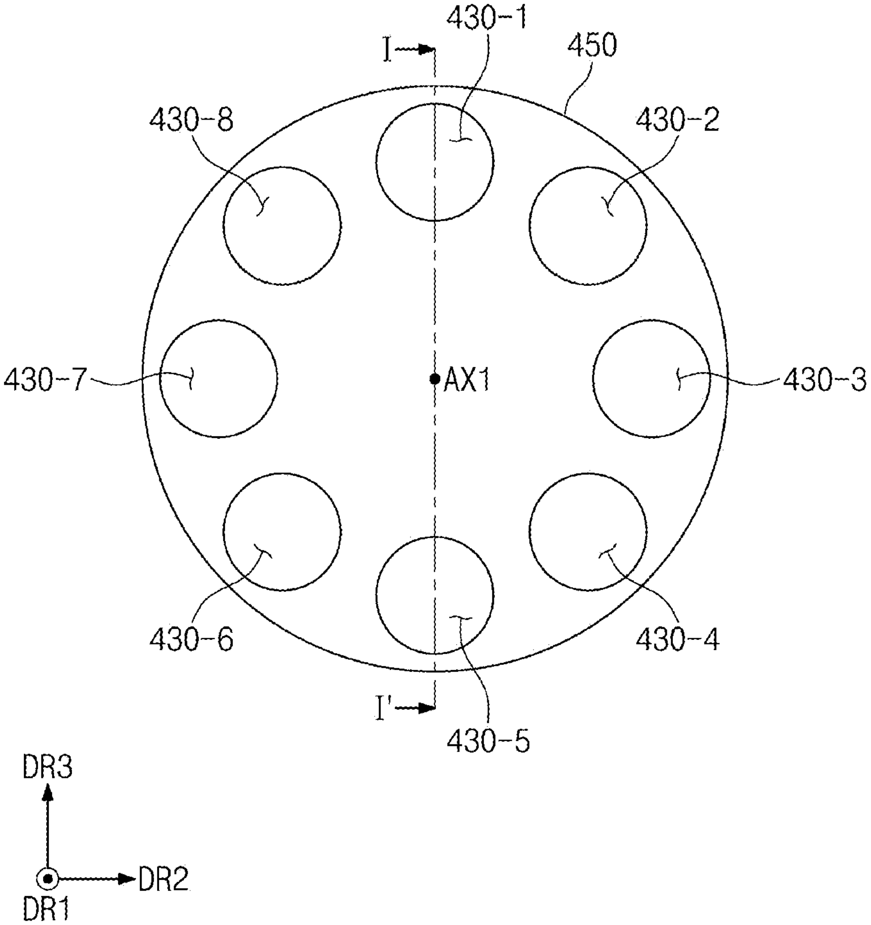
FIG. 8A is a schematic plan view of a measurement unit according to an embodiment of the disclosure.
Figure 8B:
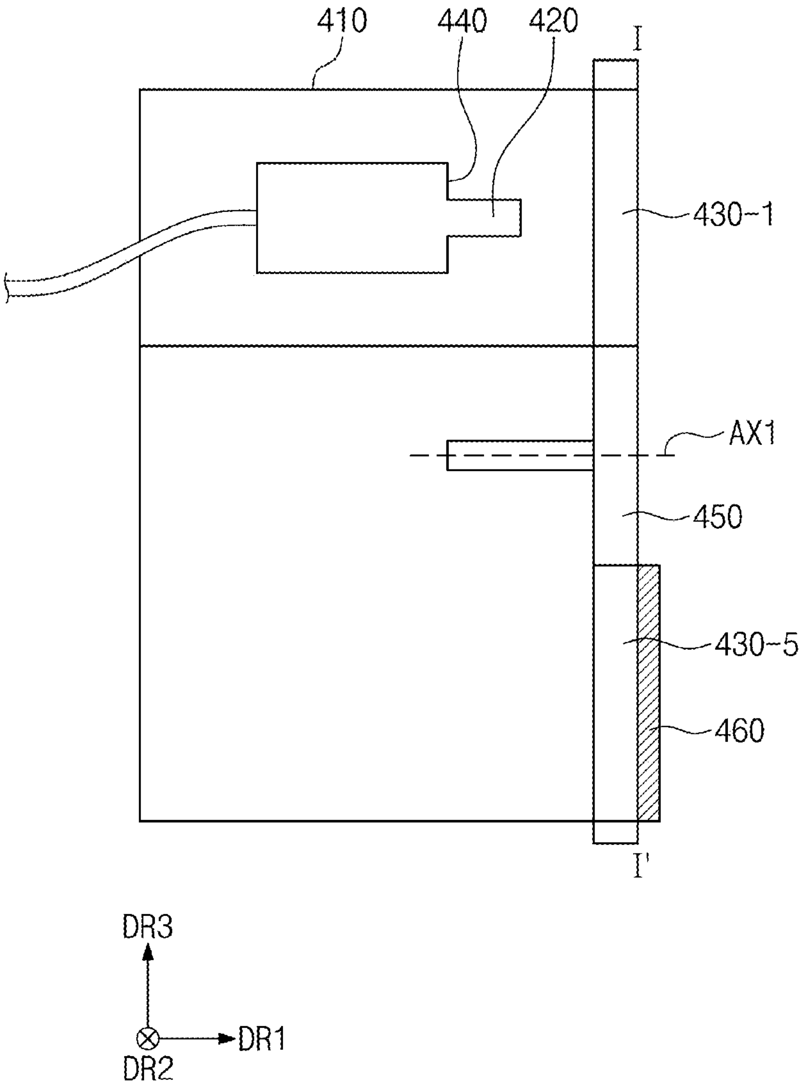
FIG. 8B is a schematic cross-sectional view taken along line I-I' of FIG. 8A according to an embodiment of the disclosure.

FIG. 8A is a schematic plan view of the measurement unit according to an embodiment of the disclosure, and FIG. 8B is a schematic cross-sectional view taken along line I-I' of FIG. 8A according to an embodiment of the disclosure.

Referring to FIGS. 1, 8A, and 8B, the measurement unit 400 may include multiple transmission portions 430-1, 430-2, 430-3, 430-4, 430-5, 430-6, 430-7, and 430-8.

The measurement unit 400 may include a rotating member 450 rotating with respect to a first axis AX1, and the transmission portions 430-1, 430-2, 430-3, 430-4, 430-5, 430-6, 430-7, and 430-8 may be disposed on the rotating member 450.

The control unit 500 may replace the transmission portions 430-1, 430-2, 430-3, 430-4, 430-5, 430-6, 430-7, and 430-8 based on the first thickness TH1. As an example, in case that the first thickness TH1 is no longer calculated because the deposition material DM may be sufficiently deposited on the transmission portion 430-1 overlapping the light source 420 and the light may not be reflected, the control unit 500 may rotate the rotating member 450 with respect to the first axis AX1 to allow the transmission portion 430-2 to overlap the light source 420. The control unit 500 may calculate the first thickness TH1 using the transmission portion 430-2.

The rotating member 450 may include blocking members 460 respectively overlapping the transmission portions 430-2, 430-3, 430-4, 430-5, 430-6, 430-7, and 430-8 that do not overlap the light source 420 among the transmission portions 430-1, 430-2, 430-3, 430-4, 430-5, 430-6, 430-7, and 430-8.

According to the disclosure, in case that the deposition process proceeds, the deposition material DM may be deposited only on the transmission portion 430-1, which overlaps the light source 420, to measure the first thickness TH1 and may not be deposited on the transmission portions 430-2, 430-3, 430-4, 430-5, 430-6, 430-7, and 430-8. For example, even though the transmission portion may be replaced with another transmission portion among the transmission portions 430-2, 430-3, 430-4, 430-5, 430-6, 430-7, and 430-8, the first thickness TH1 may be measured using the transmission portion on which the deposition material DM may not be deposited. In other words, due to the blocking members 460, the transmission portions 430-2, 430-3, 430-4, 430-5, 430-6, 430-7, and 430-8 may not be contaminated. Accordingly, the reliability of the film thickness measurement method and the substrate processing apparatus 1000 using the film thickness measurement method may be improved.

The deposition material DM deposited on each of the transmission portions 430-1, 430-2, 430-3, 430-4, 430-5, 430-6, 430-7, and 430-8 may be provided in plural. The deposition materials may include a first deposition material and a second deposition material.

In case that the first deposition material is deposited, the control unit 500 may control the transmission portions 430-1, 430-2, 430-3, 430-4, 430-5, 430-6, 430-7, and 430-8 such that one of the transmission portions 430-1, 430-2, 430-3, 430-4, 430-5, 430-6, 430-7, and 430-8 may be disposed to overlap the light source 420.

In case that the second deposition material is deposited, the control unit 500 may control the transmission portions 430-1, 430-2, 430-3, 430-4, 430-5, 430-6, 430-7, and 430-8 such that another of the transmission portions 430-1, 430-2, 430-3, 430-4, 430-5, 430-6, 430-7, and 430-8 may be disposed to overlap the light source 420 instead of the one transmission portion overlapping the light source 420 in case that the first deposition material is deposited.

The deposition process may include processes of depositing different deposition materials from each other. In this case, as shown in FIG. 5, in case that the deposition material is changed, the relative reflectance measured by the measurement unit 400 may be changed. Different from the disclosure, it may be impossible to measure the thicknesses of different deposition materials through one transmission portion. However, according to the disclosure, the control unit 500 may measure the first thickness TH1 of each of the deposition materials using the transmission portions 430-1, 430-2, 430-3, 430-4, 430-5, 430-6, 430-7, and 430-8. The control unit 500 may calculate the second thickness TH2 of each of the deposition materials deposited on the substrate SUB based on the first thickness TH1 measured by the measurement unit 400. Accordingly, the reliability of the film thickness measurement method and the substrate processing apparatus 1000 using the film thickness measurement method may be improved.

Figure 9:
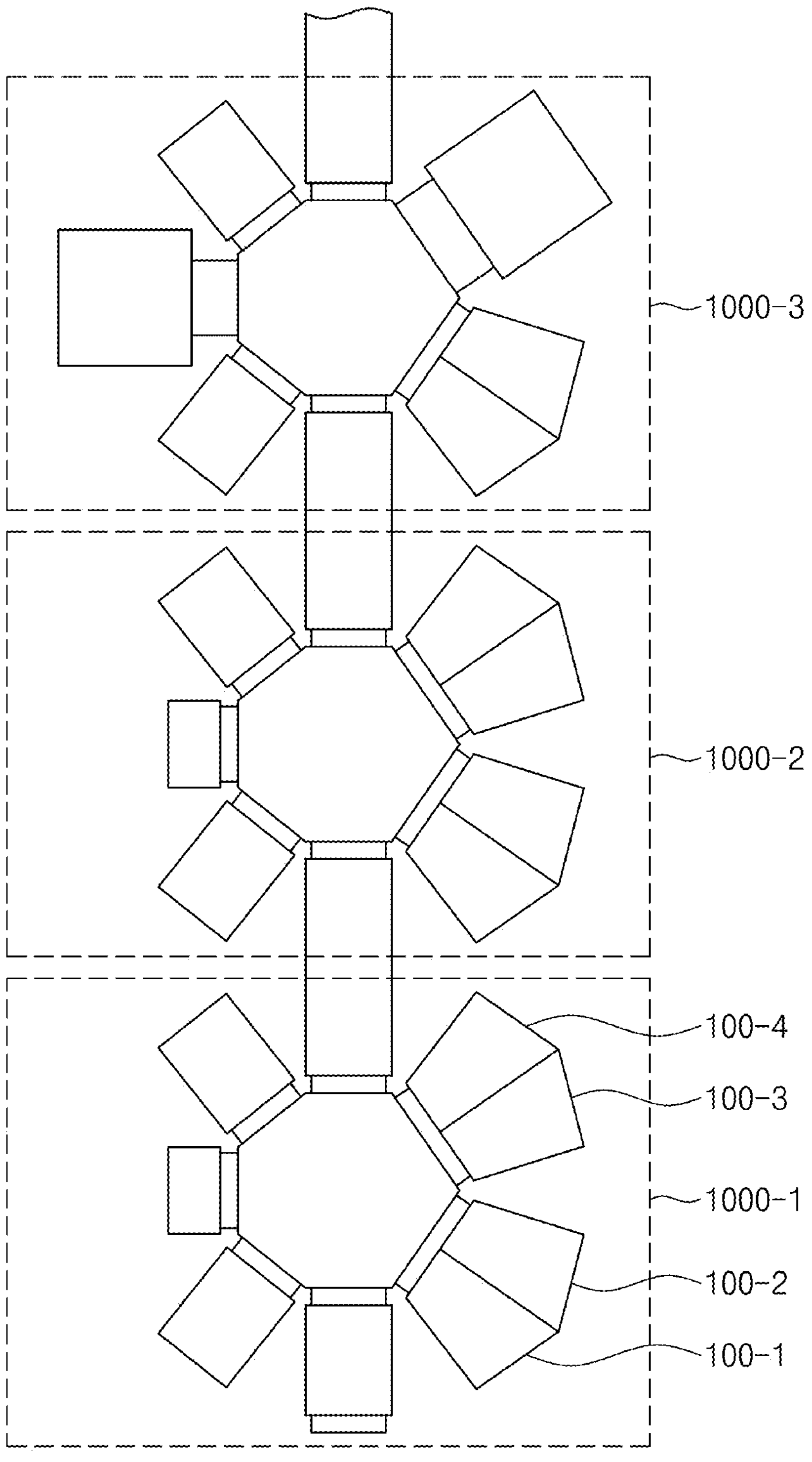
FIG. 9 is a schematic view of substrate processing apparatuses according to an embodiment of the disclosure.

FIG. 9 is a schematic view of substrate processing apparatuses 1000-1, 1000-2, and 1000-3 according to an embodiment of the disclosure.

Referring to FIGS. 1 and 9, each of the substrate processing apparatuses 1000-1, 1000-2, and 1000-3 may include chambers 100-1, 100-2, 100-3, and 100-4 each in which the deposition process may be performed. The measurement unit 400 may be disposed in each of the chambers 100-1, 100-2, 100-3, and 100-4.

The control unit 500 may calculate the second thickness TH2 of the first deposition layer FL deposited on the substrate SUB using the measurement unit 400 in real time.

Different from the disclosure, the thickness of the deposition layer deposited on the substrate SUB may be measured after the deposition process may be completed in the substrate processing apparatuses 1000-1, 1000-2, and 1000-3. In this case, errors in the deposition processes that occur in each of the substrate processing apparatuses 1000-1, 1000-2, and 1000-3 may not be detected, and the errors may be detected after the deposition processes may be completed. However, according to the disclosure, the measurement unit 400 may be disposed in each of the chambers 100-1, 100-2, 100-3, and 100-4. For example, each of the substrate processing apparatuses 1000-1, 1000-2, and 1000-3 may measure an in-situ thickness. Since the control unit 500 may calculate the second thickness TH2 of the first deposition layer FL deposited on the substrate SUB based on the first thickness TH1 measured by the measurement unit 400, the substrate processing apparatuses 1000-1, 1000-2, and 1000-3 may quickly respond to the errors in the deposition process. Accordingly, the reliability of the film thickness measurement method and the substrate processing apparatus 1000 using the film thickness measurement method may be improved.

Figure 10:
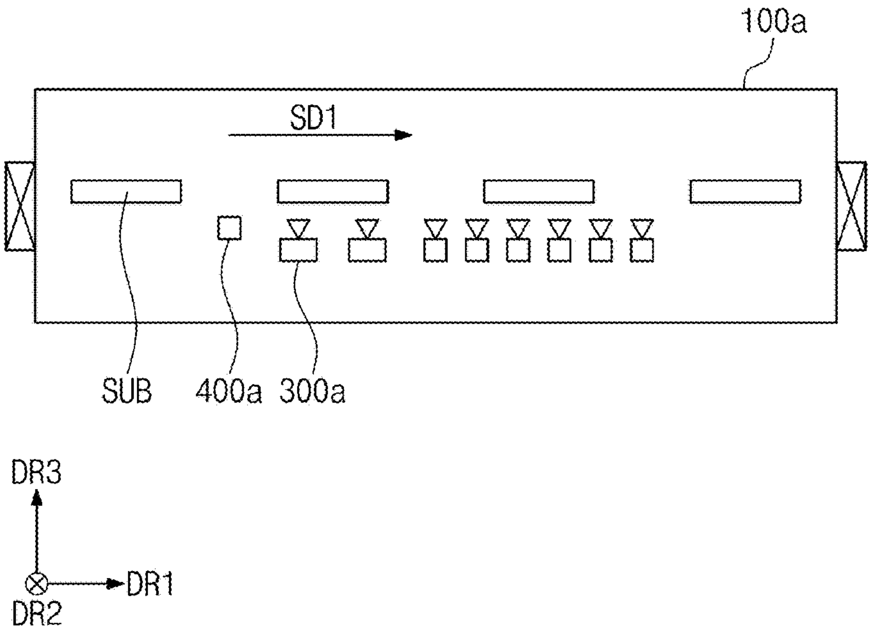
FIG. 10 is a schematic view of a substrate processing process according to an embodiment of the disclosure.

FIG. 10 is a schematic view of a substrate processing process according to an embodiment of the disclosure.

Referring to FIGS. 1 and 10, a substrate SUB may move in a movement direction SD1.

The substrate SUB may be disposed in a chamber 100*a*. A deposition material may be deposited on the substrate SUB by a deposition unit 300*a* while the substrate SUB moves in the movement direction SD1. The substrate SUB on which the deposition process may be performed may be removed from the chamber 100*a*.

A control unit 500 may calculate a second thickness TH2 of the deposition material deposited on the substrate SUB based on a first thickness TH1 measured by a measurement unit 400*a* after the substrate SUB may be removed from the chamber 100*a*. For example, the measurement unit 400*a* and the control unit 500 may calculate the second thickness TH2 in synchronization with an entry and an exit of the substrate SUB.

Figure 11:
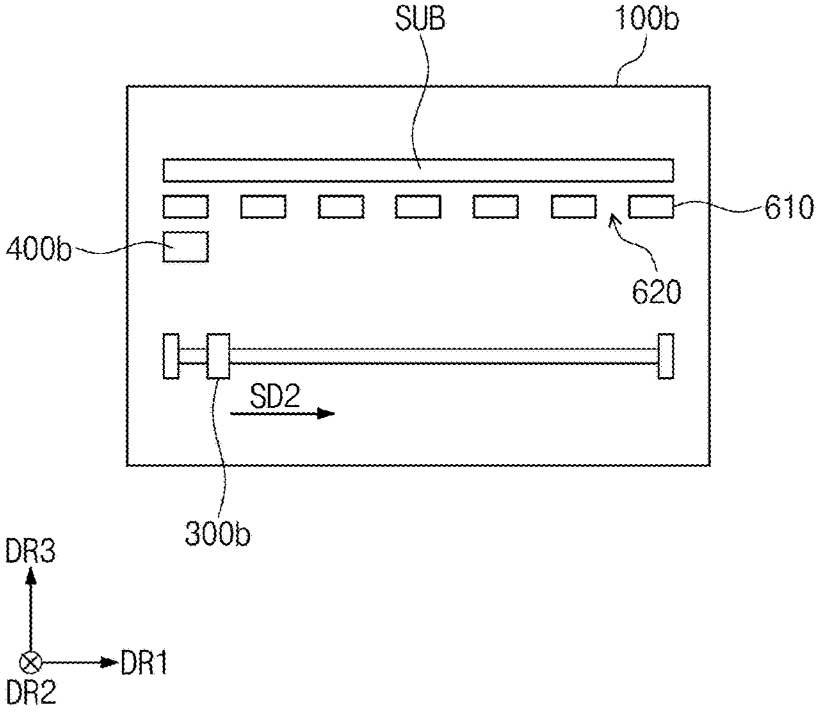
FIG. 11 is a schematic view of a substrate processing process according to an embodiment of the disclosure.

FIG. 11 is a schematic view of a substrate processing process according to an embodiment of the disclosure.

Referring to FIGS. 1 and 11, a substrate SUB may be a small and medium-sized substrate.

The substrate SUB may be disposed in a chamber 100*b*. A deposition unit 300*b* may move in a movement direction SD2. A mask assembly 610 through which slits 620 may be defined may be disposed between the substrate SUB and the deposition unit 300*b*.

A control unit 500 may calculate a second thickness TH2 of a deposition material deposited on the substrate SUB based on a first thickness TH1 measured by a measurement unit 400*b* after the deposition unit 300*b* completely moves from a side of the substrate SUB to another side of the substrate SUB. For example, the measurement unit 400*b* may calculate the second thickness TH2 in synchronization with the movement of the deposition unit 300*b*.

Figure 12:
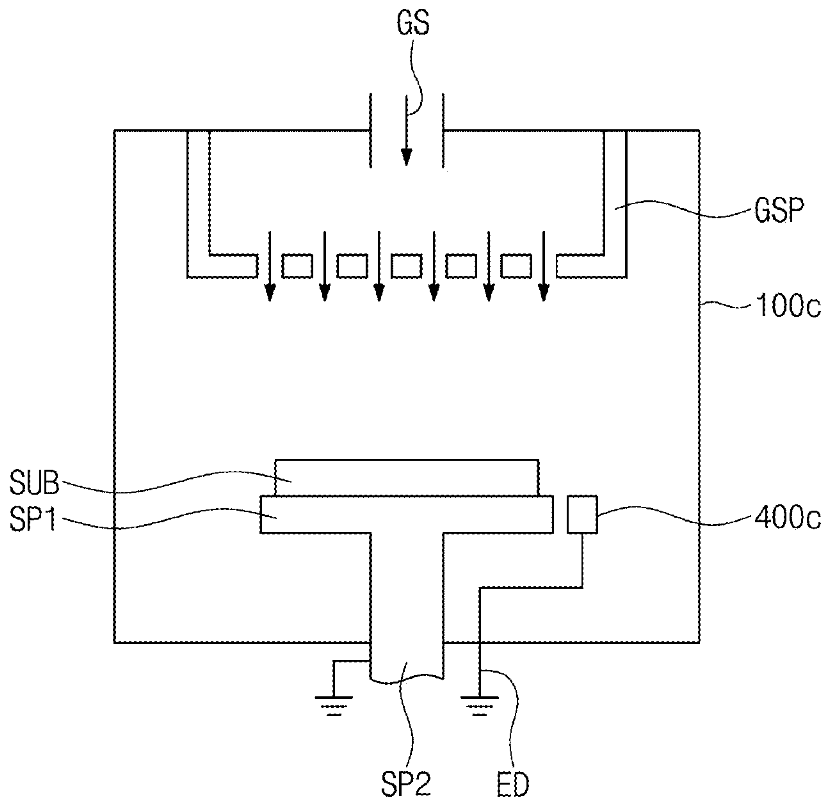
FIG. 12 is a schematic view of a substrate processing process according to an embodiment of the disclosure.

FIG. 12 is a schematic view of a substrate processing process according to an embodiment of the disclosure.

Referring to FIGS. 1 and 12, a substrate processing apparatus may deposit a thin film on a substrate SUB using a plasma enhanced chemical vapor deposition (PECVD) method that induces a chemical reaction of a process gas GS in a state in which the process gas GS may be excited into a plasma state using a high voltage energy.

The substrate processing apparatus may be disposed in a process chamber that may be blocked from the outside to form a reaction area in a vacuum state and may perform the thin film deposition process.

A gas supply unit GSP may be coupled to an upper surface of a chamber 100*c* to face the substrate SUB. The gas supply unit GSP may supply the process gas GS to the substrate SUB. The gas supply unit GSP may be provided with thru holes. The process gas GS may be uniformly supplied to the substrate SUB via the thru holes.

The substrate SUB may be disposed on susceptors SP1 and SP2. The susceptors SP1 and SP2 may be electrically connected to a ground. The susceptors SP1 and SP2 may include a first susceptor SP1 supporting the substrate SUB and a second susceptor SP2 connected to the first susceptor SP1 and penetrating through a bottom surface of the chamber 100*c*. The first susceptor SP1 and the second susceptor SP2 may be provided separately from each other or may be provided integrally with each other. The first susceptor SP1 may include an upper surface on which the substrate SUB may be disposed and a lower surface to which the second susceptor SP2 may be connected. A coupling structure between the first susceptor SP1 and the second susceptor SP2 may be changed in various ways depending on the configuration included in the substrate processing apparatus.

A measurement unit 400*c* may be electrically connected to a first electrode ED, and thus, an inner portion thereof may be excited to the plasma state. For example, the measurement unit 400*c* may be electrically connected to the ground. The process gas GS may be deposited on the transmission portion 430 (refer to FIG. 3A) of the measurement unit 400*c* plasmaized in the plasma enhanced chemical vapor deposition process. A control unit 500 may calculate a second thickness TH2 of a deposition material DM deposited on the substrate SUB based on a first thickness TH1 measured by the measurement unit 400*c*.

Although embodiments of the disclosure have been described, it is understood that the disclosure should not be limited to these embodiments but various changes and modifications can be made by one of ordinary skill in the art within the spirit and scope of the disclosure.

What is claimed is:

1. A substrate processing apparatus comprising:
a chamber including an accommodation space;
a stage disposed in the accommodation space and provided with a substrate disposed thereon;
a deposition part disposed under the stage;
a measurement part disposed adjacent to the deposition part, the measurement part including:
an accommodation portion provided with an opening defined through at least one surface thereof;
a plurality of light sources disposed in the accommodation portion and irradiating a first light;
at least one transmission portion disposed in the opening, facing the plurality of light sources, and receiving the first light; and
a reception portion facing the at least one transmission portion and receiving the first light reflected from the at least one deposition material as a second light;; and
a controller electrically connected to the measurement part,
wherein the plurality of light sources surround the reception portion,
wherein the deposition part is configured to spray the deposition material onto the substrate,
wherein the deposition part is configured to deposit the deposition material onto the transmission portion, and
wherein the measurement part is configured to communicate with the controller,
wherein the controller is configured to calculate a first thickness of the at least one deposition material deposited on the at least one transmission portion based on the second light and to calculate a second thickness of the at least one deposition material deposited on the substrate based on the first thickness,
wherein the at least one transmission portion includes transmission portions, and the controller is configured to replace the transmission portions based on the first thickness.

2. The substrate processing apparatus of claim 1, wherein the at least one transmission portion includes:
a first surface; and
a second surface facing the first surface, and the at least one deposition material is deposited on the second surface.

3. The substrate processing apparatus of claim 1, wherein the controller calculates the first thickness based on a reflectance of the at least one deposition material or a change in elliptical polarization of the at least one deposition material.

4. The substrate processing apparatus of claim 1, wherein the controller calculates the second thickness in real time.

5. The substrate processing apparatus of claim 1, wherein the measurement part further includes a rotating member that rotates with respect to a first axis, and the transmission portions are disposed on the rotating member.

6. The substrate processing apparatus of claim 5, wherein the rotating member includes blocking members blocking the transmission portions that do not overlap the plurality of light sources among the transmission portions in a cross-sectional view.

7. The substrate processing apparatus of claim 5, wherein the at least one deposition material includes deposition materials, and the deposition materials include:

a first deposition material; and a second deposition material different from the first deposition material, the controller controls the transmission portions such that one of the transmission portions is disposed to overlap the plurality of light sources in a cross-sectional view in case that the first deposition material is deposited, and the controller controls the transmission portions such that another one of the transmission portions is disposed to overlap the plurality of light sources in a cross-sectional view in case that the second deposition material is deposited.

8. The substrate processing apparatus of claim 1, wherein the first light is a white light or a laser light.

9. The substrate processing apparatus of claim 1, wherein the measurement part is disposed in the accommodation space.

10. A method of measuring a film thickness, comprising:

providing a substrate in a chamber including an inner space including a measurement part provided adjacent to a deposition part and a controller electrically connected to the measurement part, the measurement part including:

a plurality of light sources irradiating a first light;

at least one transmission portion receiving the first light, wherein the at least one transmission portion includes transmission portions; and a reception portion disposed adjacent to the plurality of light sources, wherein the plurality of light sources surround the reception portion, providing the deposition part spraying at least one deposition material onto the substrate; and depositing a deposition layer onto the at least one transmission portion;

providing the first light to the at least one transmission portion and through the transmission portion and the deposition layer, and to be provided to the at least one transmission portion as a second light after being reflected from a surface at which the deposition layer meets the inner space;

receiving the second light at the reception portion;

calculating a first thickness of the deposition layer deposited on the at least one transmission portion based on the second light and to calculate a second thickness of the at least one deposition material deposited on the substrate based on the first thickness, wherein the measurement part communicates with the controller, and wherein the controller is configured to calculate the first thickness and the second thickness; and replacing the transmission portions with the controller based on the first thickness.

11. The method of claim 10, further comprising:

removing the substrate from the chamber after the spraying of the at least one deposition material on the substrate; and calculating the second thickness of the at least one deposition material after the removing of the substrate from the chamber.

12. The method of claim 10, further comprising:

moving the deposition part after the spraying of the at least one deposition material on the substrate; and calculating the second thickness of the at least one deposition material after the moving of the deposition part.

13. The method of claim 10, wherein the at least one transmission portion includes:

a first surface facing the plurality of light sources; and a second surface facing the first surface, and the at least one deposition material is deposited on the second surface.

14. The method of claim 10, wherein the replacing of the transmission portions include rotating a rotating member on which the transmission portions are disposed with respect to a first axis.

15. The method of claim 10, wherein the at least one deposition material includes deposition materials, the deposition materials include a first deposition material and a second deposition material different from the first deposition material, and the method further comprises:

controlling the transmission portions such that one of the transmission portions is disposed to overlap the plurality of light sources in a cross-sectional view in case that the first deposition material is deposited on the second surface; and controlling the transmission portions such that another one of the transmission portions is disposed to overlap the plurality of light sources in a cross-sectional view in case that the second deposition material is deposited on the second surface.

* * * * *